United States Patent
Heaton et al.

(10) Patent No.: US 9,014,355 B2
(45) Date of Patent: Apr. 21, 2015

(54) TELECOMMUNICATION REVENUE MANAGEMENT SYSTEM

(75) Inventors: Kermit Dwain Heaton, Plano, TX (US); Stephen L. Hodge, Aubry, TX (US)

(73) Assignee: Value-Added Communications, Inc., Mobile, AL (US)

( * ) Notice: Subject to any disclaimer, the term of this patent is extended or adjusted under 35 U.S.C. 154(b) by 1444 days.

(21) Appl. No.: 10/832,987

(22) Filed: Apr. 27, 2004

(65) Prior Publication Data

US 2005/0238154 A1 Oct. 27, 2005

(51) Int. Cl.
*H04M 15/00* (2006.01)
*H04M 3/38* (2006.01)
*H04M 17/00* (2006.01)

(52) U.S. Cl.
CPC ............ *H04M 3/38* (2013.01); *H04M 17/00* (2013.01); *H04M 17/20* (2013.01); *H04M 15/00* (2013.01); *H04M 15/88* (2013.01); *H04M 15/47* (2013.01); *H04M 15/58* (2013.01); *H04M 2215/0148* (2013.01); *H04M 2215/0188* (2013.01)

(58) Field of Classification Search
CPC ..... H04M 15/00; H04M 17/00; H04M 17/20; H04M 15/47; H04M 2215/0148; H04M 15/88
USPC .............. 379/114.14, 114.16, 114.17, 114.2, 379/114.29, 127.01
See application file for complete search history.

(56) References Cited

U.S. PATENT DOCUMENTS

| | | | |
|---|---|---|---|
| 5,535,596 A | | 7/1996 | Todack |
| 5,638,430 A | | 6/1997 | Hogan et al. |
| 5,655,013 A | * | 8/1997 | Gainsboro .................... 379/188 |
| 5,867,562 A | | 2/1999 | Scherer |
| 5,875,236 A | | 2/1999 | Jankowitz et al. |
| 5,937,043 A | | 8/1999 | He |
| 6,393,269 B1 | * | 5/2002 | Hartmaier et al. ............ 455/406 |
| 6,430,274 B1 | | 8/2002 | Winstead et al. |
| 6,836,540 B2 | * | 12/2004 | Falcone et al. ........... 379/127.02 |
| 7,042,992 B1 | * | 5/2006 | Falcone et al. ........... 379/114.21 |
| 7,054,430 B2 | * | 5/2006 | Lynam et al. ............. 379/220.01 |
| 2003/0002639 A1 | * | 1/2003 | Huie ........................ 379/114.27 |
| 2004/0029564 A1 | | 2/2004 | Hodge |
| 2004/0114739 A1 | * | 6/2004 | Hausmann et al. ........ 379/114.2 |
| 2005/0123111 A1 | * | 6/2005 | Philbin et al. ............. 379/114.2 |
| 2009/0304166 A1 | | 12/2009 | Hodge |

OTHER PUBLICATIONS

Non-Final Office Action in U.S. Appl. No. 12/456,204, mailed Aug. 28, 2012, 10 pages.

* cited by examiner

*Primary Examiner* — Nafiz E Hoque

(74) *Attorney, Agent, or Firm* — Sterne, Kessler, Goldstein & Fox P.L.L.C.

(57) ABSTRACT

Disclosed is an improved revenue call management system for use with a telecommunication system. The revenue management system preferably includes a remote server, a user database, and a plurality of databases. When a call is placed, the revenue management system queries the user database based on the telephone number dialed to bill the appropriate account. If no account exists for the dialed telephone number, the revenue system queries a multitude of internal and external databases to determine if the dialed telephone number is billable. If the telephone number is un-billable, the collect call attempt is terminated. The revenue management system is capable of establishing accounts in real time while the caller and called party are on the line.

32 Claims, 4 Drawing Sheets

TELECOMMUNICATION REVENUE MANAGEMENT SYSTEM

FIELD OF THE INVENTION

The present invention relates generally to revenue management in telecommunications systems. In particular, the present invention relates to a revenue management system with the means to manage risk associated with un-billable telephone calls and debt generated by calling activity.

BACKGROUND OF THE PRESENT INVENTION

Generally, the need to monitor, control, record and provide detailed records of the usage of a telephone system in a controlled institutional environment is well recognized. It is common to utilize a controlled telephone system capable of monitoring outgoing telephone connections in many types of institutional environments, such as, but not limited to, penal institutions, military institutions, hospitals, schools, businesses, or specific types of government institutions. The reasons for monitoring and controlling institutional telephone systems are evident. To prevent such institutions from incurring unaccountable telephone costs, the institutions must either restrict access to outbound telephone lines or employ a debit system to charge the calling party for the outbound telephone call. Otherwise, unaccountable telephone costs would severally hinder the availability of the telephone systems in institutions.

However, it is often impossible to recover debt accumulated when no payment is received for completed collect calls that originate from a secure institution, such as a penal institution. The greatest portion of debt occurs because the called party cannot or will not pay the invoice. Collection efforts are made by the Local Exchange Carriers ("LECs") billing the calls, but unpaid balances are eventually written off. In addition, most LECs are slow to report bad debt experience (as much as eighteen months in arrears). As a result, information provided by the billing process is useless in terms of preventing additional losses due to non-payment from the same individual.

Additionally, some small independent local exchange carriers ("ILECs") do not offer billing services to their customers. As a result, any collect calls placed to these ILECS are un-billable. Similarly, with the advent of local competition, there are a great number of Competitive Local Exchange Carriers ("CLECs") offering local services to both residential and business customers. These carriers do not offer billing services to their customers. The only way to identify these customers is after billing is attempted and is returned as un-billable by a Billing Clearinghouse. However, this notification may not be received until two weeks after the collect call placement.

Also, on occasion, certain customers of LECs elect to place their telephone number on collect call block so that no telephone calls may be placed to that customer's telephone number. This is a common service provided by most LECs. Each LEC maintains an independent Line Information Database ("LIDB") which stores all customer account options, such as collect call block. On occasion, a collect call block is placed on the called party's telephone in between the time the collect call is placed and when the call is submitted for billing. In these cases, the LEC that would have ordinarily billed the call can reject the call record, thereby making the telephone call un-billable.

There are currently systems known in the art for testing a telephone number before a collect call is placed to determine if it is billable, or validating a collect call to determine if it is billable.

One such system validates data obtained during a telephone call. The validation system includes a number of databases that correspond to each type of data that may require validation. The validation system sends each piece of received data to the respective database, which then returns a validation response. If all of the returned responses are positive, the validation system allows the telephone call to be connected. Furthermore, the validation system is capable of blocking calls to certain telephone numbers, checking credit card information, determining whether a collect call is billable by comparing the received dialed telephone number with an external Line Information Database, etc. Such a system does not compare the dialed telephone number to a plurality of local and external databases to determine if the collect call is billable. In addition, this system does not include a local database that records the billing history of previously dialed telephone numbers for use when determining whether a collect call is billable.

Another telephone call management system having credit and fraud management features discloses that when a telephone call is placed, the telephone number associated with the party to be charged for the telephone call is compared to a customer record database to retrieve the appropriate customer record. If the customer record indicates that the billing account is fraudulent, the telephone call is blocked (i.e., not connected). The system also continuously monitors and calculates the duration and cost of each telephone call while the telephone call is in progress and records this information in a threshold counter. If the threshold counter exceeds a predetermined magnitude, the system identifies the telephone call as potentially fraudulent.

Another such system is designed to detect and prevent the fraudulent use of telephone services. Upon placement of a collect telephone call, the system searches a database to determine if the dialed telephone number is contained therein. If the dialed telephone number is found in the database, the call is terminated. Alternatively, if the dialed telephone number is not found in the database, the collect telephone call is routed to the desired destination. Thereafter, if the called party refuses to accept the collect telephone call, the system adds the called party's telephone number to the database.

Collect telephone call validation systems that query whether a collect call is billable after a called party has accepted a collect telephone call are also known. Such a system first compares the called telephone number to a database of blocked, or prohibited, telephone numbers. If the called telephone number is contained in the database, the telephone call is terminated, and if it is not in the database, the called party is prompted to accept or reject the collect telephone call. If the called party accepts the telephone call, the system initiates further comparisons of the dialed telephone number versus BNS and LIDB databases to determine if the collect telephone call is billable. If the dialed telephone number is determined to be billable, the collect telephone call is then connected to the called party.

Still another telephone call processing system utilizes subscriber profiles to allow the system to more efficiently process telephone calls. These profiles allow individual subscribers to identify global calling preferences, thereby minimizing the volume of attempted calls placed to the subscriber by the call processing system. For example, if a calling party places a collect telephone call to a specific called party subscriber, and that subscriber has elected to block all collect calls, the system immediately notifies the calling party that the collect telephone call cannot be completed without first attempting to place the telephone call.

In view of the foregoing, a need clearly exists for an improved revenue management system for managing collect calls placed using an institution's telephone call system utilizing databases to establish accounts and to verify the status of called telephone numbers. In particular, a need exists in the art for a revenue management system capable of recovering losses which result from un-billable collect telephone calls, one that is capable of establishing debit accounts for a called party, and one that is capable of verifying if a collect call is billable by checking the telephone number against a plurality of telephone number databases.

SUMMARY OF INVENTION

The present invention embodies a revenue management system for use with a pre-existing telephone management system. A telephone management system compatible with the present invention is disclosed in U.S. application Ser. No. 10/215,367, now U.S. Pat. No. 7,333,798, which is hereby incorporated by reference in its entirety. The present invention is designed to reduce a telephone management system's expenses associated with calls that are un-billable and/or un-collectible through the use of validation databases, high toll indicators, telephone call blocking, and alternative payment methods. In addition to minimizing losses resulting from un-billable calls, the revenue management system provides a means and method for regaining lost opportunity by providing un-billable parties with one or more alternative payment solutions. Calls to parties that would otherwise be un-billable such as collect calls (i.e., collect telephone and calls placed to cellular telephones, work telephones, payphones, etc.) may be completed using the revenue management system of the present invention. This system may be implemented in a variety of facilities including, but not limited to, penal institutions or similar facilities such as mental institutions, nursing homes, rehabilitation centers, correctional facilities, government agencies, private and public business, and the like.

A primary object of the present invention is to provide a revenue management system capable of being used with a pre-existing telephone management system and which is designed to reduce exposure to un-billable telephone calls and regain revenue by providing alternative payment options.

Typically, telephone management systems compatible with the present invention consist of a multitude of telephones connected to a switchboard device. The switchboard device routes calls, performs voice prompts, and responds to menu selections. Telephone calls placed by users of the telephone management system are routed through the switchboard device and connected to the proper outgoing trunk based on the type of call placed (e.g., collect, debit, etc.). An integrated cross point switch enables any telephone to access any available outgoing trunk.

The switchboard device is connected to a site server, which is commonly referred to as an ITAC (Inmate Telephone Access Control) in penal institutions or UTAC (User Telephone Access Control) in certain other types of institutions. This device serves as the main database for the telephone management system. It has the ability to log and record details of all telephone calls placed through the system and store them for a period of time defined by the institution. A recorder, which may be integral to the system or remote to the system as a separate storage means attached to the ITAC/UTAC, is responsible for recording the telephone calls and storing them in one or more databases depending on the size of the institution or the amount of data which must be archived by the institution and the capability of the storage means.

Connected to the ITAC/UTAC are a number of administrative and investigative workstations used to create, edit, and monitor user accounts and telephone calls. The investigative workstations may be used to listen to the outgoing telephone calls in real time or to access calls stored on the server or other type of database or storage means.

User-friendly software utilizing a GUI (graphical user interface) or other types of OSD capable devices may be employed to administer all user accounts of the telephone management system. The software allows a system administrator to provide calling restrictions at all levels of operation. Such restrictions may include, but are not limited to, the total number of minutes allowed, the total number of calls placed, dates and times calls are allowed, telephone exchanges allowed to be accessed, the number of times the debit inquiry system may be used, and other like restrictions.

The revenue management system of the present invention may be connected to the telephone management system in a variety of ways. It may be located at the same location as the telephone management system or at a remote location. For example, the two systems may be connected utilizing the Public Switched Telephone Network ("PSTN"), connected via a direct T1 line interconnecting the electronic switchboard device of the telephone management system to a remote server located in the revenue management system, etc. The revenue management system is comprised of a remote server connected to a multitude of local and external telephone number databases and a user database. The remote server utilizes the connected databases to determine if an outbound telephone call initiated at the telephone management system is billable. The user database contains financial information associated with each account established with the revenue management system.

The revenue management system of the present invention is utilized each time a collect call is placed by a user of the telephone management system. Typically, an inmate will choose at the beginning of the call whether the call will be debit or collect. For example, the inmate may dial a 1 prefix for debit or a 0 prefix for collect. The telephone number information is routed from the site server of the telephone management system to the remote server of the revenue management system. The revenue management system first determines if the transferred telephone number information is associated with an account in the revenue management system by accessing a revenue management system ("RMS") database connected to the remote server. If the telephone number is located in the RMS database, the remote server queries a user database attached to the remote server to determine if the telephone number associated with the account is blocked. If the telephone number is blocked, the remote server sends a signal to the site server directing it to terminate the telephone call attempt.

If the telephone number is not blocked, the user database is next queried to determine if the funds associated with the account are below a predetermined threshold. If the funds located in the account are below the predetermined threshold, the remote server instructs the site server to play a warning message to the called party indicating that the funds are low. The remote server then instructs the site server to complete the outbound telephone call. Once the outbound telephone call has been completed, the site server sends a signal to the remote server indicative of the length of the telephone call.

The remote server utilizes this information to deduct the appropriate funds from the called party's account.

However, if the telephone number associated with the transferred telephone number information received from the remote server does not have an associated account in the user database, the revenue management system next determines if the collect call is billable by checking the dialed telephone number against several telephone number databases.

The remote server first checks the dialed telephone number against the CLEC database. The CLEC database contains a list of all telephone numbers associated with parties that utilize the local telephone services of a Competitive Local Exchange Carrier. Generally, parties that utilize the services of a Competitive Local Exchange Carrier are not billable for collect calls. Each outbound telephone call is validated against the CLEC database. The dialed telephone number is blocked if it is located in the CLEC database.

If the status of the outbound telephone number is not determined by accessing the RMS database or the CLEC database, the remote server next queries two external databases. The first external database queried is the Line Information Database ("LIDB"). The LIDB is a nationally maintained database of all active telephone numbers in the North American Dialing plan. The LIDB query returns a negative result if the telephone number queried is collect call restricted by the called party or the local exchange carrier, a cellular telephone, or a payphone. That is, if a negative result is returned from the LIDB, the telephone number is un-billable. If a negative result is returned, the remote server adds the dialed telephone number to the CLEC database and sends a signal to the site server instructing it to terminate the outbound telephone call.

If the telephone number is not found in the LIDB, the remote server queries an ON-NET database. The ON-NET database is a billing clearinghouse specific database of area codes and exchanges for which billing agreements exist with the dominant/default local carrier. That is, the ON-NET database contains a list of all area codes and exchanges which are billable for collect calls. If the dialed telephone number's area code and exchange is not in the ON-NET database, the remote server sends a signal to the site server directing it to terminate the outbound telephone call. Alternatively, the remote server may provide the called party with a toll-free telephone number for setting up an account with the revenue management system. Optionally, the system may instruct the called party to dial a DTMF digit indicating that they wish to establish a credit account.

If the called party elects to set up an account with the revenue management system, the called party is routed to a revenue management system representative. The revenue management system representative acquires the information from the called party necessary to create an account. The information requested may include, but is not limited to, a first and last name, a street address, a city, a state, a country, a zip code, a telephone number, a social security number, a credit card number and expiration date, and a bank account number and associated routing code. The revenue management system representative enters the requested information into the user database as it is received from the called party. Once all of the required information has been entered by the revenue management system representative, the called party is provided an address at which to send funds if required. The called party's account is not activated until funds have been received.

Therefore, it is an object of the present invention to provide a revenue management system to proactively manage risk associated with un-billable calls and bad debt generated through calling activity.

It is another object of the present invention to provide a revenue management system capable of interfacing with a pre-existing telephone management system.

It is a further object of the present invention to reduce exposure to un-billable telephone calls through the use of validation databases, high toll indicators, blocking, and alternative payment methods.

Furthermore, it is an object of the present invention to regain lost opportunity by providing un-billable parties with an alternative payment solution.

It is an additional object of the present invention to provide a revenue management system capable of operating remote from the telephone management system that it services.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Figure 1:
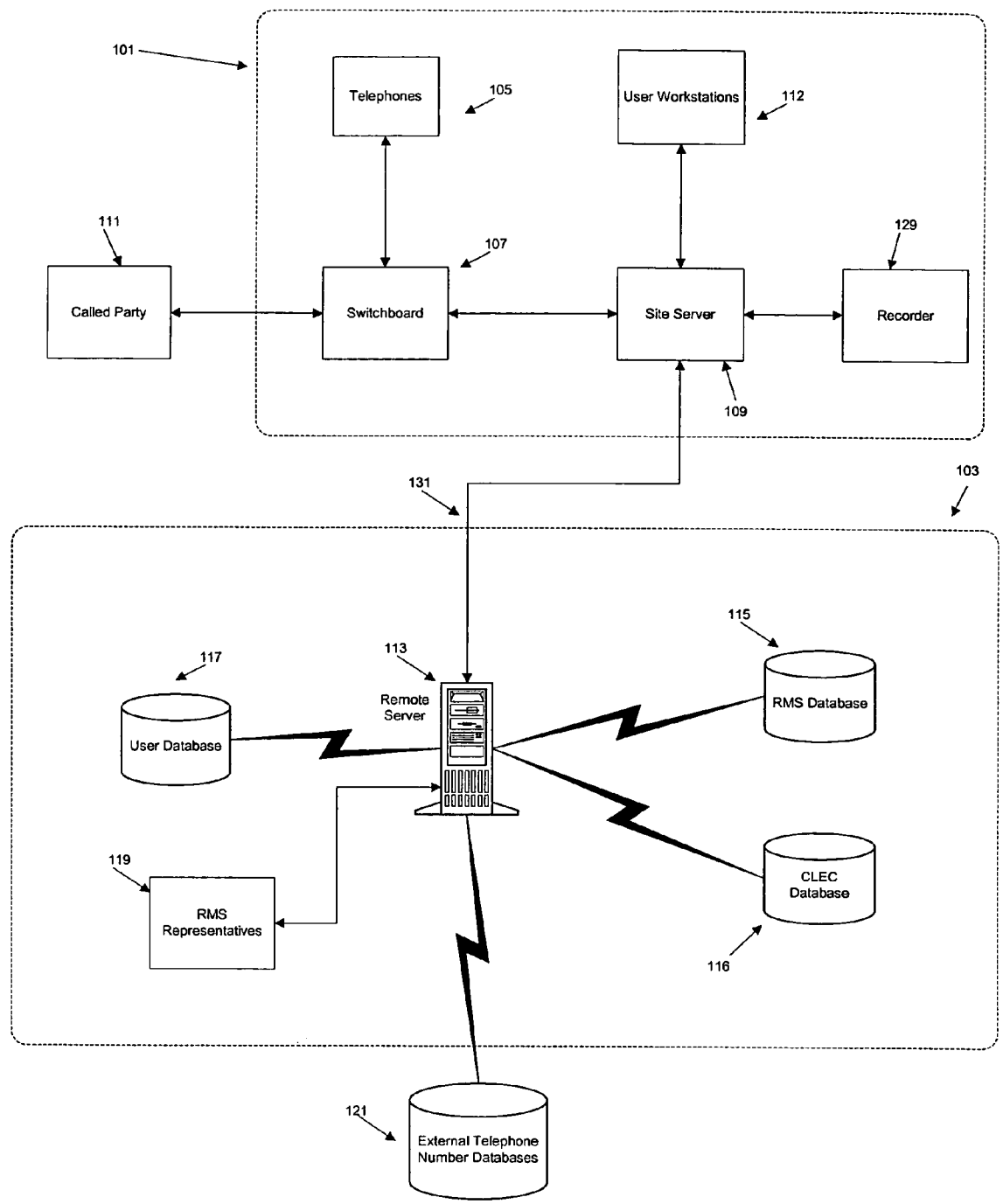
FIG. 1 depicts the architecture of the preferred embodiment illustrating the connection of a telephone management system to the revenue management system of the present invention.

Referring first to FIG. 1, shown is the connection of a telephone management system 101 to the revenue management system 103 according to the present invention. Telephone management system 101 is preferably any type known in the art and may consist of a plurality of telephones 105, switchboard device 107, site server 109, and user workstation 112. Switchboard device 107 is capable of routing telephone calls, performing voice prompts, and responding to menu selections. Calls placed by users utilizing telephones 105 within telephone management system 101 are routed through switchboard device 107 and connected to the proper called party 111. An integrated cross point switch located in switchboard device 107 enables any telephone 105 be utilized to dial the desired called party 111.

In one embodiment of the present invention, when a user attempts to access his or her account to place a call, the user may be requested, via voice prompts, to select a voice prompt language and enter a user-specific personal identification number. The information entered by the user is compared with information stored in the database for that specific user. If a corresponding PIN match is not achieved, a verification error may be provided and the system may request a re-entry of the PIN. It is foreseeable that if the second attempt fails to provide a match, the individual may be denied access to the telephone system and an official may be notified.

Once the inmate's identity is verified, the system may announce the inmate's call restrictions. For example, the system may access a pre-recorded menu of restrictions informing the inmate of specific restrictions, such as total telephone usage time, individual call length, and different payment options, such as collect call means or debit account means. The system may then connect to the desired called telephone number, provided that the number is on the accessible number list for that user. The system may first prompt the person called to select a language for future voice prompts. The language selected may then be saved in the database. Then, the called party may be informed, via voice prompts or other like means, the identity of the calling party and location from where the calling party is located (e.g., John Doe from Peters State Penitentiary. The called cart can accept or reject the caller through voice response, DTMF tones, or other like input means. If the called party provides a negative response (i.e., rejecting the call), the called party may select an option blocking calls from this caller, institution or similar calls in the future. The data may then be stored in a calling party accessible number list database. If the called party accepts the call, they may then be prompted to supply information specific to the called party (e.g., social security number, user name, date of birth, etc.). Additionally, the called party may be asked to provide a PIN to be used for future authentication. The information may be used to later identify the called party and verify permission for communication with the calling party. Alternatively, if the called party is on a pre-approved list, the call may proceed without any voice prompts in a similar manner as a normal PSTN telephone call.

The current invention may also utilize other authentication means to provide access to the telephone management system. For example, biometric data may be required to access the system. Biometric data includes, but is not limited to, voiceprints, face architecture, signature architecture, fingerprints, retinal prints, hand geometry, and the infrared pattern of the face. Such data may be acquired from users either from prior supplication to biometric systems or from the acquisition of the data from the user upon the creation of a telephone account for use with the system. This data may be stored along with the user's PIN in the user's account profile or another storage means to be used later as an authentication device.

When a user attempts to access the telephone system at a later time, the user may hear a series of voice prompts directing the user to first supply a PIN and then supply the same form of biometric information that is stored in the database. For example, if the user's thumbprint was stored digitally in the database, the user would have to supply a thumbprint to a device capable of scanning it and converting the resulting data to the same format as the information in the database. The scanned data would then be compared to the information maintained in the storage database. If a positive match occurs based on the PIN and biometric data entered, then the user would be granted access to the system subject to user specific restrictions.

Biometric authentication means may also be implemented to authenticate the called party. In this type of system, the authentication may include one or more biometric authentication means in addition to non-biometric authentication means. In this embodiment, before the called party is allowed to converse with the caller, the called party may be asked to supply voice authentication and/or provide a PIN. This information may be stored in a database either prior to a user's first call or when the first call is made. If the data has been stored prior to the call, the called party would have to state the pre-recorded phrase. The recorded data would then be compared with information in the database. If the data is in compliance with the information in the database to within some pre-assigned statistical threshold, the system would allow the call to proceed and a connection would be made. If the data had not been stored prior to the call, it would be retrieved from the called party and used for future voice authentication.

A further authentication means that may be utilized by the present invention is the use of radio frequency ("RF") authentication. The user can be required to have in the user's possession some type of radio frequency identification technology to access the telephone system. This may be accomplished in a number of ways.

Switchboard device 107 is preferably connected to site server 109, which is commonly referred to as an ITAC (Inmate Telephone Access Control) in penal institutions or UTAC (User Telephone Access Control) in certain other types of institutions. Site server 109 serves as the main processing unit for telephone management system 101. Site server 109 has the ability to log and record details of all telephone calls placed from telephones 105 and store them for a period of time defined by the institution. Recorder 129, which may be integral to the system or remote to site server 109, is responsible for recording the telephone calls and storing them in one or more databases depending on the size of the institution or the amount of data which must be archived by the institution and the capability of the storage means.

Connected to site server 109 are a multitude of user workstations 112 used to create, edit, and monitor user accounts and telephone calls. User workstations 112 may be used to listen to the outgoing telephone calls in real time or to access calls stored on site server 109 or another type of database or storage means.

User-friendly software, located on site server 109 or user workstations 112, utilizing a graphical user interface ("GUI") or other type of on-screen display capable device may be employed to administrate the user accounts of telephone management system 101. This software may allow a system administrator to provide calling restrictions at all levels of operation. Such restrictions may include, but are not limited to, the total number of minutes allowed, the total number of calls placed, dates and times calls are allowed, telephone exchanges allowed to be accessed, the number of times the debit inquiry system may be used, and other like restrictions.

Revenue management system 103 preferably comprises remote server 113, RMS database 115, CLEC database 116, user database 117, and RMS representatives 119. In the preferred embodiment of the present invention, site server 109 of telephone management system 101 is connected to remote server 113 of revenue management system 103 via direct connection 131, which may be a dedicated T1 line, T3 line, etc. or other optional connection. When a telephone call is placed utilizing telephone 105, switchboard device 107, under control of site server 109, routes the telephone call to the proper called party 111. However, before site server 109 directs switchboard device 107 to connect the outbound telephone call to called party 111, site server 109 first sends a query to remote server 113 to determine if the outbound telephone call is billable and therefore authorized. To determine if the outbound telephone call is billable, remote server 113 first accesses RMS database 115 to determine if the telephone number associated with the outbound telephone call has an established account with the system. If the outbound telephone number has an account, remote server 113 next queries user database 117 to determine the status of the account. User database 117 preferably contains financial information for each account in the system. Depending upon the returned status of the account from user database 117, remote server 113 sends a signal to site server 109 directing it to either allow switchboard 107 to complete the outbound telephone call to called party 111 or terminate the telephone call.

On the other hand, if the outbound telephone call does not have an established account, as determined by RMS database 115, remote server 113 next queries competitive local exchange carrier ("CLEC") database 116 to determine if the outbound telephone call is billable. If the telephone number is found in CLEC database 116, remote server 113 transmits a signal to site server 109. This signal directs site server 109 to either query the user to set up an account, complete or terminate the outbound telephone call to called party 111 depending upon the query result.

If the telephone number is not in CLEC database 116, remote server 113 next queries external telephone number databases 121 to determine if the outbound telephone call is billable. Depending upon the results of the external telephone number databases 121 query, remote server 113 sends a signal to site server 109 directing it to complete or terminate the outbound telephone call. Alternatively, remote server 113 may connect called party 111 to which the outbound telephone call was placed to RMS representative 119 to setup a revenue management system account.

Figure 2:
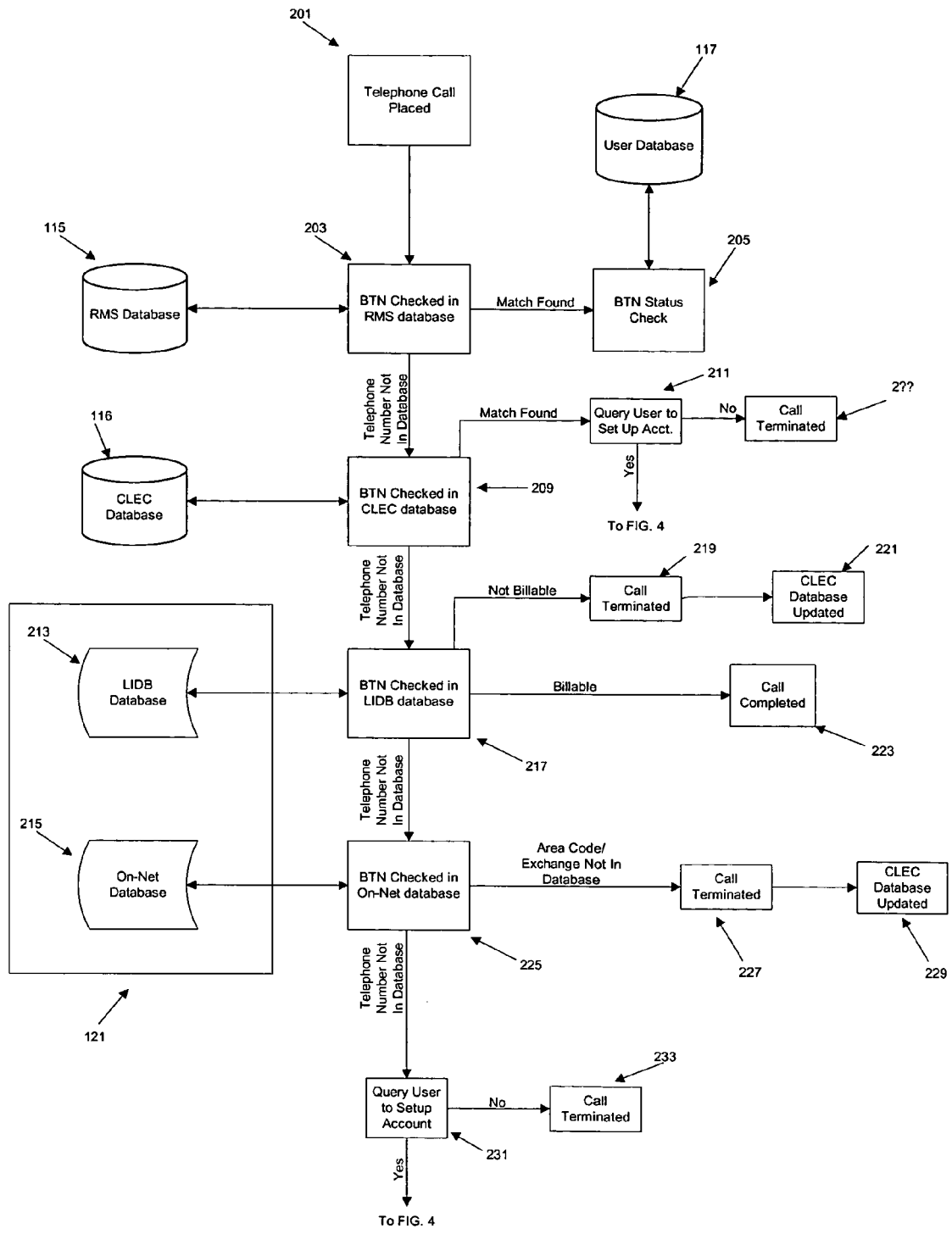
FIG. 2 is a flow diagram of the preferred method of operation of the revenue management system according to the present invention showing the process utilized to determine if an outbound telephone number is billable or un-billable.

Referring next to FIG. 2, shown is the call flow diagram depicting the query steps utilized by remote server 113 to determine if the telephone number associated with called party 111 has an associated account with revenue management system 103 and, if the outbound telephone call does not have an account, to determine if the outbound telephone call is billable. The revenue management system query begins when an outbound telephone call is placed in step 201. Remote server 113 first accesses RMS database 115 in step 203 to determine the status of the dialed telephone number. RMS database 115 contains a list of all telephone numbers having an established account with the revenue management system. Telephone numbers stored in RMS database 115 are designated as a good billable number, a revenue management system account telephone number, or a blocked telephone number. If the dialed telephone number is located in RMS database 115, remote server 113 next determines the status of called party's 111 account in step 205.

Figure 3:
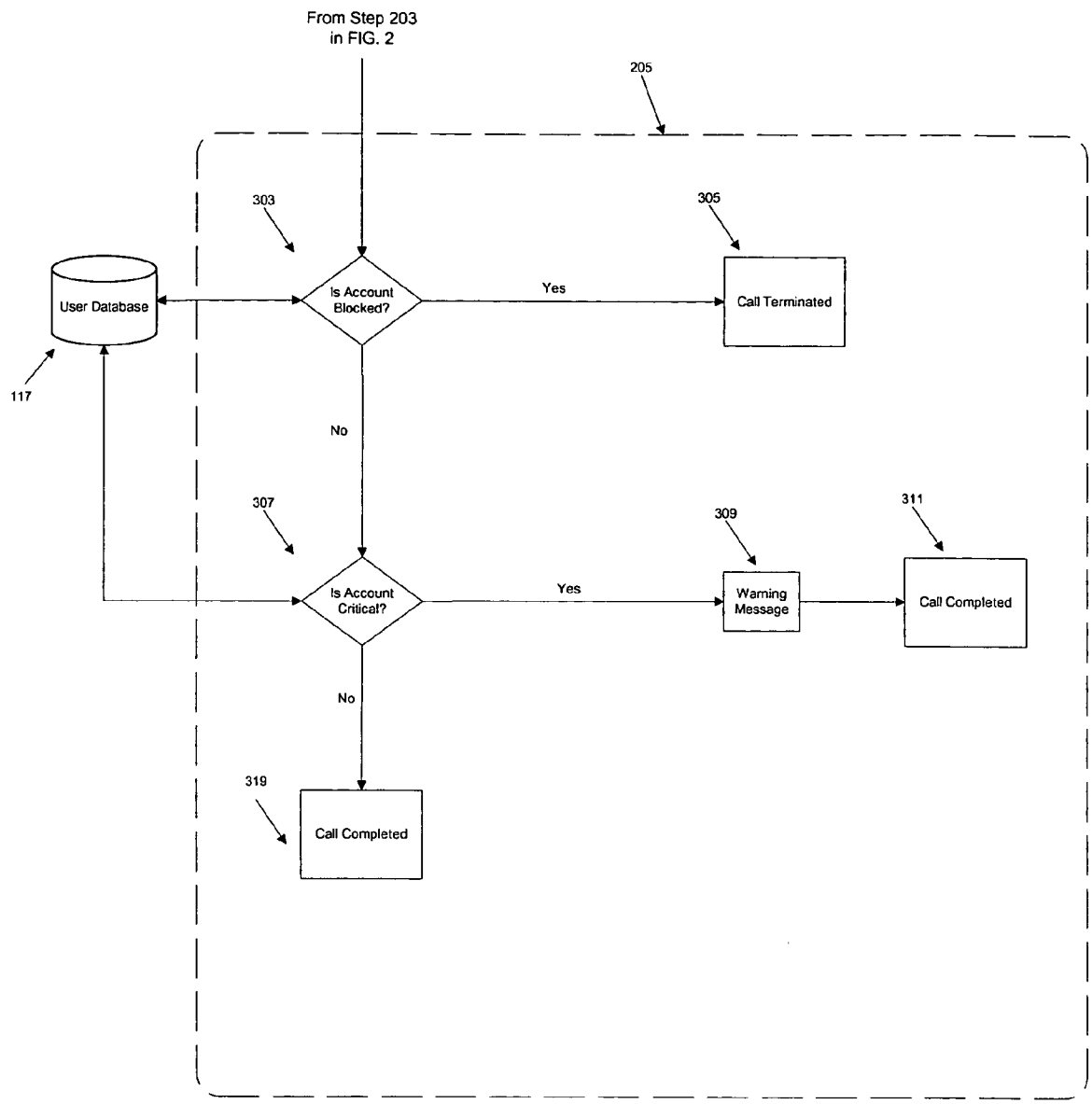
FIG. 3 is a detailed flow diagram of the BTN Status Check step depicted in FIG. 2.

Shown in FIG. 3 is a detailed flowchart of the process utilized by step 205 to determine the status of any account called party 111 has in RMS database 115. Once it is determined that an account exists in RMS database 115, remote server 113 queries user database 117 to determine if the account is blocked in step 303. If the telephone number is blocked, remote server 113 sends a signal to site server 109 directing it to terminate the outbound telephone call in step 305.

If the telephone number is not blocked, remote server 113 queries user database 117 to determine if the funds associated with the account are below a predetermined threshold in step 307. If the funds located in the account are below the predetermined threshold, remote server 113 instructs site server 109 to play a warning message to called party 111 indicating that the funds located in the account are low in step 309. For example, the warning message may be "The balance of this account is below $15.00. Please call 1-888-XXX-YYYY to prevent this number from being blocked." Remote server 113 then instructs site server 109 to complete the outbound telephone call in step 311. Once the outbound telephone call has been completed, site server 109 sends a signal remote server 113 indicative of the length of the telephone call. Remote server 113 utilizes this information to deduct the appropriate funds from the called party's account stored in user database 117.

Turning back to FIG. 2, if the dialed telephone number is not found in RMS database 115, remote server 113 next determines if the dialed telephone number, or bill-to-number ("BTN"), is billable. To determine if the BTN is billable, remote server 113 first queries CLEC database 116 located at the same geographic location as remote server 113. CLEC database 116 contains a list of all telephone numbers associated with parties that utilize the local telephone services of a Competitive Local Exchange Carrier. Generally, collect calls made to parties that utilize a CLEC as a Local Exchange Carrier are not billable because no billing agreement exists between the local exchange carrier and the inter-exchange carrier. Each outbound telephone call is validated against CLEC database 116 in step 209. If a match is found between a telephone number in CLEC database 116 and the dialed telephone number, the collect call attempt is not billable. If this occurs, remote server 113 sends a signal to site server 109 directing it to query the user to set up an account in step 211. If the called party chooses not to set up an account, the telephone call is terminated in step 212. However, if the called party does choose to setup an account, called party 111 is connected to or dials the toll-free telephone number associated with the revenue management system and proceeds to establish an account as is discussed in more detail below with respect to FIG. 4.

If the BTN is not located in CLEC database 116, remote server 113 next queries remote telephone number databases 117 to determine if the BTN is billable. In the preferred embodiment of the present invention, external telephone number databases 121 consist of Line Interface Database ("LIDB") 213 and ON-NET database 215. Remote server 113 queries LIDB 213 in step 217. LIDB 213 is a nationally maintained database of all active telephone numbers in the North American Dialing plan. A query to LIDB 213 returns a negative result if the telephone number queried is collect call restricted by the called party or by the local exchange carrier or if the telephone number is a cellular telephone, a payphone, etc. A query to LIDB 213 returns a positive result if the telephone number is in the database. That is, if a negative result is returned from LIDB 213, the telephone number is not billable, and if a positive result is returned from LIDB 213, the telephone number is billable. If a negative result is returned when remote server 113 queries LIDB 213 in step 217, remote server 113 sends a signal to site server 109 instructing it to terminate the outbound telephone call in step 219. The dialed telephone number is then added to RMS database 115 in step 221 so that all future collect calls to the called telephone number are blocked. In contrast, if LIDB 213 returns a positive result, remote server 113 sends a signal to site server 109 instructing it to complete the collect call in step 223.

Figure 4:
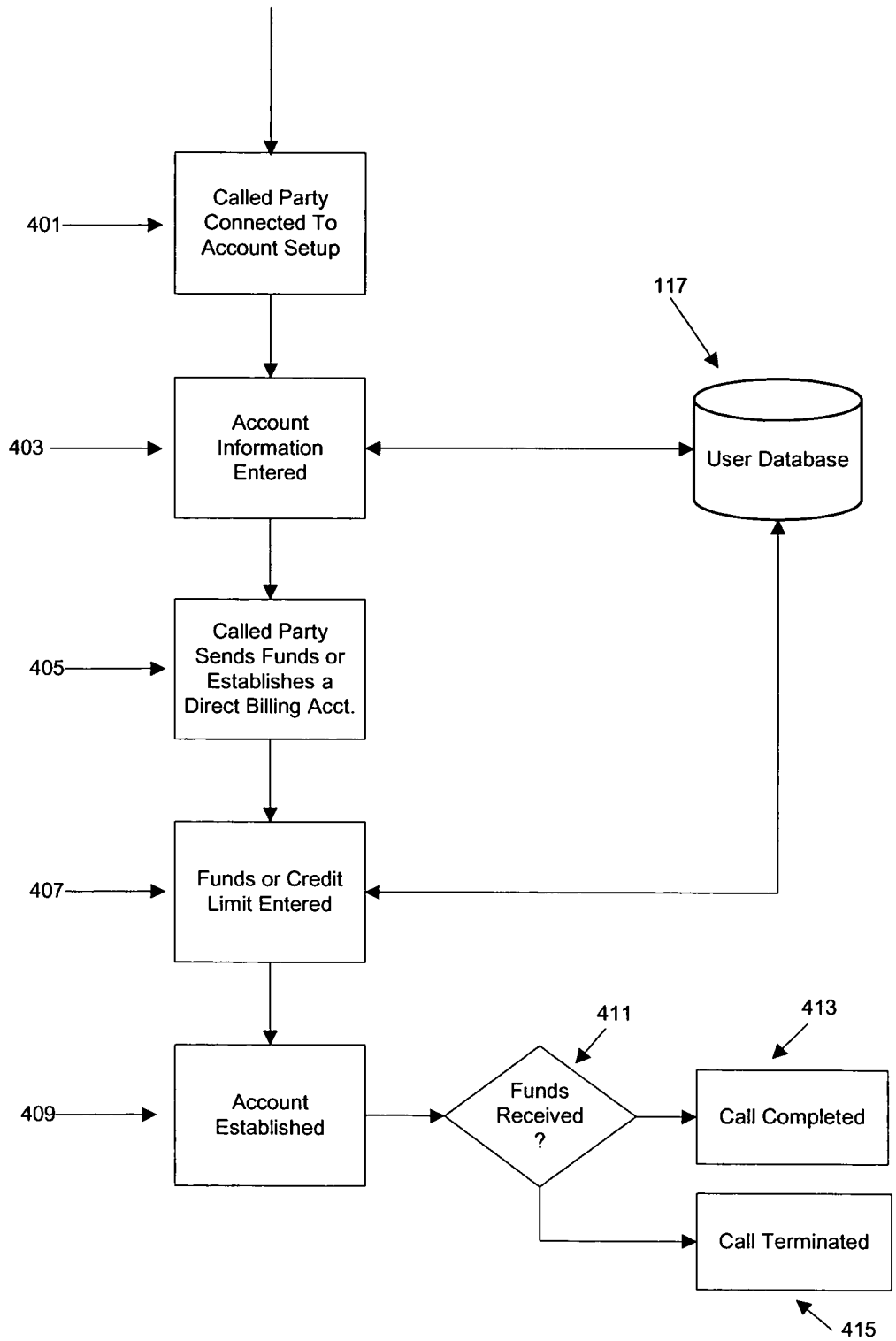
FIG. 4 is a flow diagram depicting the steps for a user to setup an account with the system according to the preferred embodiment of the invention.

If the dialed telephone number is not found in LIDB 213, remote server 113 queries ON-NET database 215 in step 225. ON-NET database 215 is a billing clearinghouse specific database of area codes and exchanges for which billing agreements exist with the dominant/default local carrier. That is, ON-NET database 215 contains a list of all area codes and exchanges which are billable for collect calls. If the dialed telephone number's area code and exchange is not in ON-NET database 215, remote server 113 sends a signal to site server 109 directing it to terminate the outbound telephone call in step 227. The dialed telephone number is then added to RMS database 115 in step 229 so that all future collect calls to the called telephone number are blocked. Alternatively, remote server 113 may provide the called party with the option of setting up an account with the revenue management system in step 231. If the called party chooses not to set up an account, the telephone call is terminated in step 233. However, if the called party does choose to setup an account, called party 111 is connected to or dials the toll-free telephone number associated with the revenue management system in step 401, as depicted in FIG. 4. Called party 111 is greeted by RMS representative 119 who acquires account information from called party 111 in step 403. The account information may include, but is not limited to, a first and last name, a street address, a city, a state, a zip code, a country of residence, a social security number, a telephone number, a gender (i.e., male or female), a credit card number and associated expiration date, and a bank account number and associated bank routing code. RMS representative 119 enters the received account information into user database 117 as it is received from called party 111. Next the method of payment is established in step 405. The system of the present invention enables called party 111 to pay the balance of an account with a credit card, a bank account number, or with direct billing (e.g., where a monthly statement is sent to the called party). Alternatively, if called party 111 does not use one of these methods, called party 111 is directed to send funds to an address supplied by RMS representative 119 to complete the setup of the account in step 405. The funds sent to the revenue management service may include a check, a money order, cash, or any other similar payment method. Once the funds are received at the address supplied to called party 111 by RMS representative 119, RMS representative 119 enters the amount of funds into user database 117 in step 407. Once the funds are received or the method of payment is established, RMS representative 119 activates called party's 111 account in step 409.

The system of the present invention enables a called party to setup an account while the calling party is still connected to the system. As discussed with respect to FIG. 2, when an outbound telephone call is placed, there are various points at which the system may query the called party to set up an account. If the called party chooses to setup an account, and an account is successfully established in step 409, the call may be completed. Specifically, the system verifies that funds are received in step 411. If funds are received, the call is completed (i.e., the called party and the calling party can converse) in step 413. However, if funds for the account are not received, the call is terminated in step 415.

While the present invention has been described with reference to the preferred embodiment and several alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A telecommunications management system, comprising:
   a telephone management system configured to complete a telephone call between a calling party and a called party, said telephone call being associated with a telephone number of said called party; and
   a revenue management system, in communication with said telephone management system, said revenue management system comprising a processor and a revenue management database configured to store a plurality of user accounts, said processor being configured:
   to query said revenue management database to determine if said telephone number is associated with an account of said plurality of accounts,
   to query a first validation database to determine whether said telephone number is billable when said telephone number is not associated with said account,
   to query a second validation database to determine whether said telephone number is billable when said telephone number is not in said first validation database and to cause said first validation database to be updated with said telephone number when said telephone number is un-billable, and
   to direct said telephone management system to set up a new account within said plurality of accounts for said called party when said telephone number is not associated with said account and is billable,
   wherein said telephone management system is further configured to establish said new account and to complete said telephone call when funds are received from or a method of payment is established by said called party associated with said new account, and
   wherein said telephone management system is not of or associated with a telecommunications service provider.

2. The telecommunications management system according to claim 1, wherein said telephone management system is further configured to prompt said called party to establish said new account associated with said telephone number if said telephone number is not associated with said account.

3. The telecommunications management system according to claim 2, wherein said prompt is implemented by an interactive voice response (IVR) system.

4. The telecommunications management system according to claim 2, wherein said prompt instructs said called party to provide information to establish said new account, said information including:
   said method of payment, or
   an address where said called party is to send said funds.

5. The telecommunications management system according to claim 2, wherein said called party and said calling, party remain on-line during said prompts.

6. The telecommunications management system according to claim 2, wherein said telephone management system is further configured to disconnect said calling party from said telephone call if said called party proceeds to establish said new account.

7. The telecommunications management system according to claim 6, wherein said telephone management system is further configured to direct said called party to dial a toll-free number to establish said new account or to prompt said called party to select a dtmf number to establish said new account.

8. The telecommunications management system according to claim 6, wherein said telephone management system is further configured to connect said called party to said calling party only after said new account is established.

9. The telecommunications management system according to claim 2, wherein said called party is prompted by said telephone management system to establish said new account associated with said telephone number,
wherein said called party is further prompted to accept said telephone call.

10. The telecommunications management system according to claim 2, wherein said called party establishes said new account while said calling party and said called party are connected to said telephone call.

11. The telecommunications management system according to claim 1, wherein said method of payment is selected from the group consisting of: credit card payment direct billing, debit card, check, money order, and cash.

12. The telecommunications management system according to claim 1, wherein said processor is further configured to deduct appropriate funds associated with said telephone call from said account once said telephone call has been completed.

13. The telecommunications management system according to claim 1, wherein telephone management system is further configured to prompt when said account is overdrawn.

14. The telecommunications management system according to claim 13, wherein said telephone management system is further configured to terminate said telephone call when said account is overdrawn.

15. The telecommunications management system according to claim 13, wherein said telephone management system is further configured to prompt said called party to replenish said account when said account is overdrawn.

16. The telecommunications management system according to claim 1, wherein said telephone management system is disposed in an institution selected from the group consisting of: a penal institution, a mental institution, a nursing home, a rehabilitation center, a correctional facility, a government agency, a private business, and a public business.

17. The telecommunications management system according to claim 1, wherein said processor is further configured to query a user database to determine whether said telephone number is blocked when said telephone number is associated with said account.

18. The telecommunications management system according to claim 17, wherein said processor is further configured to query said user database to determine whether said funds associated with said account are below a predetermined threshold, to direct said telephone management system to play a warning message to said called party when said funds associated with said account are below said predetermined threshold, and to direct said telecommunications management system to complete said telephone call.

19. The telecommunications management system according to claim 18, wherein said processor is further configured to deduct appropriate funds associated with said telephone call from said account once said telephone call has been completed.

20. The telecommunications management system according to claim 18, wherein said telephone management system is configured to provide a warning prompt if said account is critical and not blocked.

21. The telecommunications management system according to claim 17, wherein said telephone call is terminated if said telephone number is blocked.

22. The telecommunications management system according to claim 17, wherein said processor is further configured to direct said telephone management system to complete said telephone call if said telephone number is not blocked.

23. The telecommunications management system according to claim 1, wherein said first validation database is a Competitive Local Exchange Carriers database.

24. The telecommunications management system according to claim 1, wherein said telephone call is un-billable when said telephone number matches a telephone number stored in said first validation database.

25. The telecommunications management system according to claim 1, wherein said second validation database is a Line Interface Database or a ON-NET database.

26. The telecommunications management system according to claim 1, wherein said processor is further configured to direct said telephone management system to set up said new account when said telephone number is not in said first and said second validation databases.

27. A telecommunications management system for detecting a billable telephone call, comprising:
a telephone management system comprising a telephone management server and a plurality of workstations, said telephone management system being configured to complete a telephone call between a calling party and a called party to a telephone number; and
a revenue management system, having a processor and a revenue management system database configured to store information regarding a plurality of user accounts, said processor being configured to:
query said revenue management system database to determine if said telephone number is associated with an account of said plurality of accounts,
query a first remote validation database to determine whether said telephone number is billable when said telephone number is not associated with said account,
query a second remote validation database to determine whether said telephone number is billable when said telephone number is not in said first remote validation database,
cause said first remote validation database to be updated with said telephone number when said telephone number is found in said second remote validation database, and
direct said telephone management system to set up a new account within said plurality of accounts for said called party when said telephone number is not in said first and second remote validation databases and to complete said telephone call when funds are received from or a method of payment is established by said called party associated with said new account,
wherein said telephone management system is remote from a telecommunications service provider, and wherein said telephone management server is further configured to monitor and to record at least one conversation in said telephone call.

28. The telecommunications management system according to claim 27, wherein at least one of said first and said second remote validation databases is selected from the group consisting of: an ON-NET database, a line information database, and a competitive local exchange carrier database.

29. The telecommunications management system according to claim 27, wherein said processor is further configured to terminate said telephone call when said telephone number is found in at least one of said first and said second remote validation databases.

30. The telecommunications management system according to claim 27, wherein said processor is further configured to direct said called party to add funds or credit limits to said account via conferencing or a toll-free telephone number.

31. The telecommunications management system according to claim 27, wherein said processor is further configured to play a warning message to said called party if funds in said account are below a predetermined amount.

32. A remote management system for detecting whether a telephone number is a billable or an un-billable telephone number, comprising:
   a plurality of validation databases configured to store at least one of:
      a plurality of user accounts, or
      a plurality of telephone numbers: and
   a server configured to:
      query a first validation database from among said plurality of validation databases to determine if said telephone number, associated with a telephone call, is associated with an account of said plurality of accounts,
      query a second validation database from among said plurality of validation databases to determine whether said telephone number is said billable telephone number when said telephone number is not associated with said account,
      query a third validation database from among said plurality of validation databases to determine whether said telephone number is said billable telephone number when said telephone number is not found in said second validation database,
      cause said second validation database to be updated with said telephone number when said telephone number is said un-billable telephone number, and
      direct a telephone management system to set up a new account within said plurality of accounts for a called party when said telephone number is not associated with said account and is said billable telephone number,
   wherein said telephone management system is further configured to establish said new account when said telephone number is said billable telephone number and to complete said telephone call when funds are received from or a method of payment is established by said called party associated with said new account, and
   wherein said telephone management system is not of or associated with a telecommunications service provider.

\* \* \* \* \*

UNITED STATES PATENT AND TRADEMARK OFFICE
CERTIFICATE OF CORRECTION

PATENT NO. : 9,014,355 B2  
APPLICATION NO. : 10/832987  
DATED : April 21, 2015  
INVENTOR(S) : Heaton et al.

Page 1 of 1

It is certified that error appears in the above-identified patent and that said Letters Patent is hereby corrected as shown below:

Column 13, line 2, please replace --calling, party-- with "calling party".

Signed and Sealed this
Twenty-third Day of August, 2016

Michelle K. Lee
*Director of the United States Patent and Trademark Office*